(12) United States Patent
Hill

(10) Patent No.: US 10,557,532 B2
(45) Date of Patent: Feb. 11, 2020

(54) MOVABLE LATCH HOUSING APPARATUS

(71) Applicant: Hubert Junior Hill, Golden, CO (US)

(72) Inventor: Hubert Junior Hill, Golden, CO (US)

( * ) Notice: Subject to any disclaimer, the term of this patent is extended or adjusted under 35 U.S.C. 154(b) by 758 days.

(21) Appl. No.: 15/161,214

(22) Filed: May 21, 2016

(65) Prior Publication Data

US 2016/0340946 A1 Nov. 24, 2016

Related U.S. Application Data (60) Provisional application No. 62/165,686, filed on May 22, 2015.

(51) Int. Cl.
| | | |
|---|---|---|
| *E05F 15/668* | (2015.01) | |
| *F16H 21/44* | (2006.01) | |

(52) U.S. Cl.
CPC .......... *F16H 21/44* (2013.01); *E05F 15/668* (2015.01); *E05Y 2900/106* (2013.01)

(58) Field of Classification Search
CPC ......... E06B 5/11; E05F 15/668; E05F 15/678; E05F 15/673; E05F 15/684; E05F 15/686; E05B 17/2003; E05B 65/0021; E05Y 2900/106
USPC .......... 160/201, 188; 49/197, 199, 140, 139; 16/DIG. 1, DIG. 7; 292/346, DIG. 2, 292/DIG. 36
See application file for complete search history.

(56) References Cited

U.S. PATENT DOCUMENTS

| | | | | |
|---|---|---|---|---|
| 3,235,246 A * | 2/1966 | Cowan | ................... | E05F 15/684 49/139 |
| 3,630,094 A * | 12/1971 | Carli | ..................... | E05F 15/684 49/139 |
| 3,858,452 A * | 1/1975 | Gatland | .............. | F16H 25/2025 74/424.78 |
| 4,107,877 A * | 8/1978 | Lee | ........................ | E05F 15/673 49/28 |
| 4,311,225 A * | 1/1982 | Tsubaki | .................. | E05F 15/41 116/86 |
| 4,344,252 A * | 8/1982 | Suzuki | .................. | E05F 15/668 318/266 |
| 4,414,778 A * | 11/1983 | Carli | ....................... | E05F 15/67 49/199 |
| 4,597,428 A * | 7/1986 | Iha | ........................ | E05F 15/686 160/188 |

(Continued)

*Primary Examiner* — Katherine W Mitchell
*Assistant Examiner* — Johnnie A. Shablack
(74) *Attorney, Agent, or Firm* — Roger A. Jackson (57) ABSTRACT

A movable latch housing apparatus and method of installation for enhancing security of a latch mechanism that has a channel with a linear drive that is removably engagable to a slidable engagement structure with a shoulder that is pivotally attached through an arm to a door for automated opening and closing, with a lever that can selectably disengage the slidable engagement structure from the linear drive to allow the door to open freely. The apparatus includes a base and a pair of opposing sidewalls each extending in a same direction perpendicular to and straddling the base and attach to the shoulder, the sidewalls extend beyond the base forming an open ended slot for arm movement. Wherein operationally, the base and the sidewalls shield the lever from unauthorized access to help prevent disengagement of the lever from the linear drive which would allow the door to be freely opened.

9 Claims, 7 Drawing Sheets

(56) References Cited

U.S. PATENT DOCUMENTS

| | | | |
|---|---|---|---|
| 4,615,548 A | 10/1986 | McGee | |
| 4,628,636 A * | 12/1986 | Folger | E05F 15/41 49/199 |
| 4,653,565 A * | 3/1987 | Iha | E05F 15/686 160/193 |
| 4,905,542 A * | 3/1990 | Burm | E05F 15/668 104/120 |
| 4,911,486 A * | 3/1990 | Anderson | E05B 67/38 292/148 |
| 5,010,688 A * | 4/1991 | Dombrowski | F16G 1/00 160/189 |
| 5,027,553 A * | 7/1991 | Vergara | E05F 15/668 49/30 |
| 5,315,953 A * | 5/1994 | Mullarkey, Jr. | E04H 6/426 116/28 R |
| 5,367,825 A * | 11/1994 | Doring | E05F 15/686 403/46 |
| 5,477,710 A * | 12/1995 | Stefanutti | E05B 67/38 70/417 |
| 5,535,802 A * | 7/1996 | Chambers | E05F 17/004 160/113 |
| 5,588,257 A * | 12/1996 | Duhame | E05F 15/673 49/199 |
| 5,737,946 A * | 4/1998 | Sole | E05B 13/001 292/104 |
| 6,065,314 A * | 5/2000 | Nicholson | E05B 67/383 292/218 |
| 6,089,626 A | 7/2000 | Shoemaker | |
| 6,273,174 B1 * | 8/2001 | Singleton | E05F 15/681 160/188 |
| 6,456,022 B1 * | 9/2002 | Fitzgibbon | E05D 15/38 318/162 |
| 6,793,253 B2 | 9/2004 | Bruwer et al. | |
| 6,928,843 B1 | 8/2005 | Pirnie | |
| 7,862,209 B2 * | 1/2011 | Fitzgibbon | E05F 15/668 362/246 |
| D667,036 S * | 9/2012 | Myers | D15/199 |
| 8,353,543 B2 | 1/2013 | Harrison | |
| 8,403,022 B2 * | 3/2013 | Womacks | E05F 15/684 160/201 |
| 8,438,784 B1 * | 5/2013 | Marinelli | B60J 5/14 296/186.4 |
| 8,453,706 B2 * | 6/2013 | Shepherd | E05F 15/684 160/188 |
| 8,936,064 B1 * | 1/2015 | Diaz | E05F 15/681 160/201 |
| 9,382,728 B1 * | 7/2016 | Williams | E05B 65/0021 |
| 9,512,639 B2 * | 12/2016 | Schulte | E05B 13/001 |
| 9,631,420 B2 * | 4/2017 | Regenold | E06B 5/113 |
| 2005/0140323 A1 * | 6/2005 | Fitzgibbon | E05D 15/38 318/468 |
| 2009/0100756 A1 * | 4/2009 | Chambers | E05F 15/668 49/55 |
| 2009/0249695 A1 * | 10/2009 | Jain | E05F 15/668 49/148 |
| 2012/0019011 A1 * | 1/2012 | Laborde | E05B 13/001 292/1 |
| 2013/0247627 A1 * | 9/2013 | Szczygielski | E05B 65/0021 70/431 |
| 2016/0340946 A1 * | 11/2016 | Hill | E05F 15/668 |
| 2017/0096840 A1 * | 4/2017 | Henderson, Sr. | E05B 65/0021 |
| 2017/0096852 A1 * | 4/2017 | Mello, II | E05F 15/681 |
| 2018/0202218 A1 * | 7/2018 | Guerra | E05F 1/00 |
| 2018/0223580 A1 * | 8/2018 | Tsui | E05F 15/681 |

\* cited by examiner

MOVABLE LATCH HOUSING APPARATUS

RELATED PATENT APPLICATION

This application claims the benefit of U.S. provisional patent application Ser. No. 62/165,686 filed on May 22, 2015 by Hubert Junior Hill of Golden, Colo., U.S.

TECHNICAL FIELD

The present invention relates generally to housings that enclose a latch. More particularly, the present invention of a latch housing apparatus is to specifically protect a lever of the latch from an exterior environment intrusion that could cause the lever to move and unlatch from a wire rod positioned in the exterior environment that could snag the lever, wherein the present invention is operable to encase the lever such that the wire rod cannot contact the lever from the exterior environment.

BACKGROUND OF INVENTION

The typical residential garage door that is operated by an automatic door opener relays upon the motor drive, usually a chain or a worm gear to hold the door in either the open or closed position via the motor being stopped and the chain or worm gear through a sliding channel engagement structure (being parallel and adjacent to the garage ceiling) wherein the sliding channel engagement structure has a pivotal linkage attached to the upper portion of the garage door to pull the door upward and horizontal for opening and push the door horizontal and downward for closing. To accommodate motor or electrical failure, a disengagement lever is positioned to disengage the chain or worm gear from the sliding channel engagement structure, thus allowing the free manual opening and closing of the garage door as if the automatic door opener was not present.

Typically for accommodating the operation of the automatic garage door opener for a conventional garage door lock (i.e. a lock as between the garage door and the garage door frame) is disabled, to allow the automatic garage door opener to freely open and close the door. So therein lies the problem, once the disengagement lever is positioned to disengage the chain or worm gear from the sliding channel engagement structure, the garage door can be freely open and closed manually by anyone, thus if this disengagement lever can be accessed from outside of the garage door, the interior of the garage can easily be available to thieves. This has unfortunately turned out to be the case due to the flexibility of the relatively large garage door, a steel rod that can be feed therethrough the gap between the garage door and its frame on the upper portion of the garage door when the garage door is closed, wherein the steel rod can "hook" the disengagement lever and be pulled to disengage the lever thus allowing the sliding channel engagement structure to be free to allow the garage door to be freely manually opened by anyone on the outside or in the external environment of the garage door.

One solution to this problem is to add a zip tie, bolt, or rod to in effect lock to disengagement lever in the engaged position to the chain or worm gear, thus thwarting the thief in disengaging the lever with a steel rod, however, there are several problems with this solution in that the thief could pull their steel rod hard enough to overcome the zip tie, bolt, or rod to still get the garage door open, plus in an emergency, say a fire or power outage, the zip tie, bolt, or rod could in effect lock someone in their garage thus trapping them in their garage. A better solution would be to maintain the ease at which the original disengagement lever can be positioned to disengage the chain or worm gear from the sliding channel engagement structure in the event of an emergency to allow an escape of the individual through the garage door to outside of the house, while at the same time preventing access of the thieves steel rod to the disengagement lever.

Looking at the prior art in this area in U.S. Pat. No. 4,615,548 to McGee, disclosed is a door lock system having a solenoid that includes a plunger retractable from a latch hole, which can be manually slid away from the latch hole also. In McGee, the solenoid is mounted on a slidable bracket by leaf springs with bent ends that permit the coil to pivot when the plunger is forced against a side of the latch hole.

Next, in U.S. Pat. No. 6,089,626 to Shoemaker, disclosed is a method and apparatus for selectively securing and un-securing a movable closure to a support frame, being designed specifically for a garage door opener locking mechanism as between the worm gear or chain and sliding channel. The security device in Shoemaker of the present invention comprises a locking assembly attached to the frame and a securing element attached to the closure. In Shoemaker, the locking assembly comprises a first rotating element having a detent, a second rotating element being engaged with the first rotating element, and a rotating latching element being selectively engagable with the second rotating element, thus requiring at least two distinct action movements to unlock the worm gear or chain from the sliding channel, thus making it difficult to unlock the mechanism with simply a steel rod inserted therethrough the top gap of the garage door to its frame, as previously described.

Further in Shoemaker, when the movable closure is secured, the detent of the first rotating element is securely coupled with the securing element and this mechanism allows for the lock to be dis-engaged rather easily from an individual who needs access to the outside during a garage door opener power, or house fire, or other emergency situation, as opposed to the previously described zip tie or bolt that would not be amenable to unlocking the garage door opener mechanism to open the garage door in an emergency.

Next, in the prior art in U.S. Pat. No. 6,928,843 to Pirnie disclosed is an enclosure assembly for enclosing a tamper-evident security seal for sealing a hasp assembly that comprises a first enclosure portion and a second enclosure portion. In Pirnie, a post is coupled to the first enclosure portion for extending through the generally aligned holes of the hasp members of the hasp assembly to secure the hasp members together and position the first enclosure portion behind the security seal. Thus, in Pirnie the second enclosure portion includes an aperture formed therein for receiving the post so that the second enclosure member engages the first enclosure portion and covers the security seal. In this manner, in Pirnie the first enclosure portion and the second enclosure portion cooperate to at least substantially enclose the security seal wherein a latching member secures the second enclosure portion to the first enclosure to limit unauthorized access to the security seal.

Continuing, in the prior art in U.S. Pat. No. 8,353,543 to Harrison, disclosed is a locking arrangement for a door that includes an upright operating bar mounted on the door for angular movement about its axis and a handle which is connected to the operating bar by a pivotal connection for engagement with a closure mechanism. In Harrison, the handle and the closure mechanism include co-operating apertures wherein a housing is adapted to cover the pivotal connection of the handle and at least a part of the closure mechanism, to help prevent easy pilfering of the door locking mechanism. Further, in Harrison, a releasable securing means passes through apertures formed in both the handle and the closure mechanism and secures the housing relative to the handle and the closure mechanism.

Next, in the prior art in U.S. Pat. No. 6,793,253 to Bruwer, et al., disclosed is a lock which includes a bolt, a catch, and a handle for manually moving the catch from an operative position to an inoperative position, further a first link means and electrically actuable means for causing movement of the first link means between first and second positions are included. Wherein, in Bruwer, the first link means, at the first position, is translating movement of the handle in a first direction into movement of the bolt from a locked position to an unlocked position and at the said second position, allowing handle movement in the said first direction without corresponding movement of the bolt.

What is need is a movable latch housing apparatus that is of a simple construction that protects against an external rigid steel rod being able to easily hook the disengagement latch lever and thus pulling upon the lever to disengage the sliding channel engagement structure from the automatic garage door opener worm gear or chain resulting in the garage door being easily manually opened and allowing access to the outside thief to the garage interior. Further, the latch housing apparatus needs to be able to accommodate the existing easy desirable disengagement of the latch lever and thus pulling upon the lever to disengage the sliding channel engagement structure from the automatic garage door opener worm gear or chain to allow opening of the garage door in the event of motor failure, power outage, or other emergency, such as a fire to allow the garage interior occupant an easily available egress from the garage interior to the external environment. A further need, would be to have the latch housing apparatus be adaptable to an existing automatic garage door opener mechanism that includes the disengagement lever that is positioned to disengage the chain or worm gear from the sliding channel, the sliding channel engagement structure, and the linkage that is pivotally attached to the upper portion of the garage door, this way the latch housing apparatus could be installed upon an existing automatic garage door opener mechanism thus partially encasing the mechanism to help protect against an external steel rod having disengaging access to the disengagement lever.

SUMMARY OF INVENTION

Broadly, the present invention is a movable latch housing apparatus for enhancing security of a latch mechanism. Wherein the latch mechanism has a channel guide, a slidable channel engagement structure, a pivotal attachment shoulder, an extension arm pivotally attached to the shoulder and oppositely pivotally attached to a door, a disengagement lever pivotally attached to the shoulder and removably engaged to a linear drive in the channel with the lever having an engaged state wherein the linear drive opens and closes the door and the lever having a disengaged state allowing the door to be manually opened and closed freely without the linear drive.

The movable latch housing apparatus includes a base having a longitudinal axis with a first margin and an opposing second margin with the longitudinal axis spanning therebetween, further the base also having a first border and an opposing second border that are positioned about the longitudinal axis in a straddle manner and juxtapose to the longitudinal axis.

Also included in the movable latch housing apparatus is a pair of opposing sidewalls each extending in a same direction from the first border and the second border, with the sidewalls extending parallel to a longwise axis that is oriented in a perpendicular manner to the longitudinal axis. The sidewalls each have an elongation beyond the first margin forming an open ended slot as between the first margin and the sidewalls that the extension arm has pivotal movement within. The sidewall elongations each have a means for affixment to the pivotal attachment of the shoulder. Wherein operationally, a combination of the base and the pair of sidewalls substantially enclose the disengagement lever through its pivotal movement as between the engaged state and the disengaged state to help prevent a device external to the housing from placing the lever from the engaged state to the disengaged state.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 1 shows a perspective view of the movable latch housing apparatus installed on the automatic garage door opener mechanism including the garage door, the channel guide, and the extension arm pivotally attached to both the garage door and a pivotal attachment to a shoulder, wherein the housing substantially encloses the disengagement lever through its pivotal movement via the combination of the base and the sidewalls thus shrouding the disengagement lever from external prying by the device that can attempt to move the disengagement lever from the engaged state to the disengaged state thus allowing the garage door to be freely opened by anyone, note that the housing travels with the slidable engagement as against the channel of the automatic garage door opener mechanism, further shown is the first margin forming the open ended slot that gives clearance for the pivotal movement of the extension arm;

FIG. 4 shows a portion of the entire garage perspective view of the movable latch housing apparatus installed on the automatic garage door opener mechanism including the garage door, the channel guide, and the extension arm pivotally attached to both the garage door and a pivotal attachment to the shoulder, wherein the housing substantially encloses the disengagement lever through its pivotal movement via the combination of the base and the sidewalls thus shrouding the disengagement lever from external prying by the device that can attempt to move the disengagement lever from the engaged state to the disengaged state thus allowing the garage door to be freely opened by anyone, note that the housing travels with the slidable engagement as against the channel of the automatic garage door opener mechanism, further shown is the open ended slot that gives clearance for the pivotal movement of the extension arm;

FIG. 5 shows a perspective view of the prior art automatic garage door opener mechanism including the garage door, the channel guide, the slidable engagement structure, the pivotal attachment shoulder, the extension arm pivotally attached to both the garage door and a pivotal attachment to a shoulder, the disengagement lever, the pivotal attachment of the disengagement lever to the shoulder, the pivotal movement of the disengagement lever, the linear drive, and the disengagement lever being in an engaged state to the linear drive, this would be considered the normal default state of the automatic garage door opener, wherein the automatic garage door opener fully controls the opening and closing of the garage door, however, for illustration of the problem of placing the disengagement lever into the disengaged state from an unauthorized external device, the device is shown in a typical position via prying through the upper portion of the garage door to reach the disengagement lever from outside of the garage door and with the device typically being of rigid construction that can "hook" the disengagement lever as shown;

FIG. 6 shows a perspective view of the prior art automatic garage door opener mechanism including the garage door, the channel guide, the slidable engagement structure, the pivotal attachment shoulder, the extension arm pivotally attached to both the garage door and a pivotal attachment to a shoulder, the disengagement lever, the pivotal attachment of the disengagement lever to the shoulder, the pivotal movement of the disengagement lever, the linear drive, and the disengagement lever being in a disengaged state to the linear drive, as being a continuation from FIG. 5, FIG. 6 shows the device is shown in a typical pulled position wherein the device can attempt to move the disengagement lever from the engaged state to the disengaged state thus allowing the garage door to be freely manually opened by anyone as shown; and FIG. 7 shows a perspective view of the prior art automatic garage door opener mechanism including the garage door, the channel guide, the slidable engagement structure, the pivotal attachment shoulder, the extension arm pivotally attached to both the garage door and a pivotal attachment to a shoulder, the disengagement lever, the pivotal attachment of the disengagement lever to the shoulder, the pivotal movement of the disengagement lever, the linear drive, and the disengagement lever being in a disengaged state to the linear drive, as being similar to FIG. 5, however, FIG. 7 shows the device in a typical pulled position wherein the device can attempt to hook onto the bulb that is connected to the release pull cord to enable movement of the disengagement lever from the engaged state to the disengaged state thus allowing the garage door to be freely manually opened by anyone as shown.

REFERENCE NUMBERS IN DRAWINGS

50 Movable Latch Housing Apparatus
51 External environment
55 Latch mechanism that can be a garage door opener
56 Channel guide
57 Opposite sides of the latch mechanism 55
60 Slidable channel engagement structure
65 Shoulder for pivotal attachment
70 Pivotal attachment of the shoulder 65
75 Extension arm
80 Pivotal attachment of the extension arm 75 to the shoulder 65
81 Pivot beam
85 Door that can be a garage door
90 Pivotal movement of the extension arm 75
95 Opposite pivotal attachment of the extension arm 75 to the door 85
100 Disengagement lever
105 Pivotal attachment of the disengagement lever 100 to the shoulder 65
110 Pivotal movement of the disengagement lever 100 as between the engaged state 130 and the disengaged state 135
115 Linear drive
120 Linear drive opening door 85
125 Linear drive closing door 85
130 Engaged state of the lever 100 to the linear drive 115
135 Disengaged state of the lever 100 to the linear drive 115
140 Manually freely opening door 85
145 Manually freely closing door 85
150 Base
155 Longitudinal axis of the base 150
160 First margin of the base 150
165 Second margin of the base 150
170 First border of the base 150
175 Second border of the base 150
180 Straddle manner of positioning of the first 170 and second 175 borders to the longitudinal axis 155
185 Juxtapose positioning of the first 170 and second 175 borders to the longitudinal axis 155
190 Sidewalls
191 First end of the sidewalls 190
192 Second end of the sidewalls 190
193 Aperture disposed within each sidewall 190
194 Arm disposed as between each of the base sections 211 of the sidewalls 190
195 Longwise axis
196 First boundary of sidewall 190
197 Second boundary of sidewall 190
198 Affixed junction as between the first boundaries 196 and the first 170 and second 175 borders
200 Extending parallel of the sidewalls 190 to the longwise axis 195
205 Perpendicular orientation manner of the longwise axis 195 to the longitudinal axis 155
210 Elongation section of the sidewall 190 beyond the first margin 160
211 Base section of the sidewall 190
215 Open ended slot formed by the first margin 160 and the sidewall elongation 210
216 Passage formed by the second ends 192 and the second margin 165
217 Housing interior defined by the pair of sidewalls 190 and the base 150
220 Means for affixment of the sidewall elongations 210 to the pivotal attachment 70 of the shoulder 65
225 Substantial enclosing of the disengagement lever 100 for its pivotal movement 110 form the combination of the base 150 and the pair of sidewalls 190
230 Device that can be in the form of a rigid hooked rod 235 External volume outside of the housing 50
240 Pulling of the device 230 to place the disengagement lever 100 from the engaged state 130 to the disengaged state 135
250 Prior art release pull cord for manually placing the disengagement lever 100 either into the engaged state 130 or the disengaged state 135
251 Bi-directional extensions of the pull cord 250
252 Sheave for the bi-directional pull cord extensions 251 from the arm 194
253 Attachment of the pull cord 250 to the disengagement lever 100
255 Bulb grab end of the release pull cord 250
260 Flexible security guide sleeve for the release pull cord 250
261 Primary end of the sleeve 260
262 Secondary end of the sleeve 260
265 Fastener as between the sleeve 260 and the extension arm 75
266 Fastener as between the sleeve 260 and the base 150

DETAILED DESCRIPTION

Figure 1:
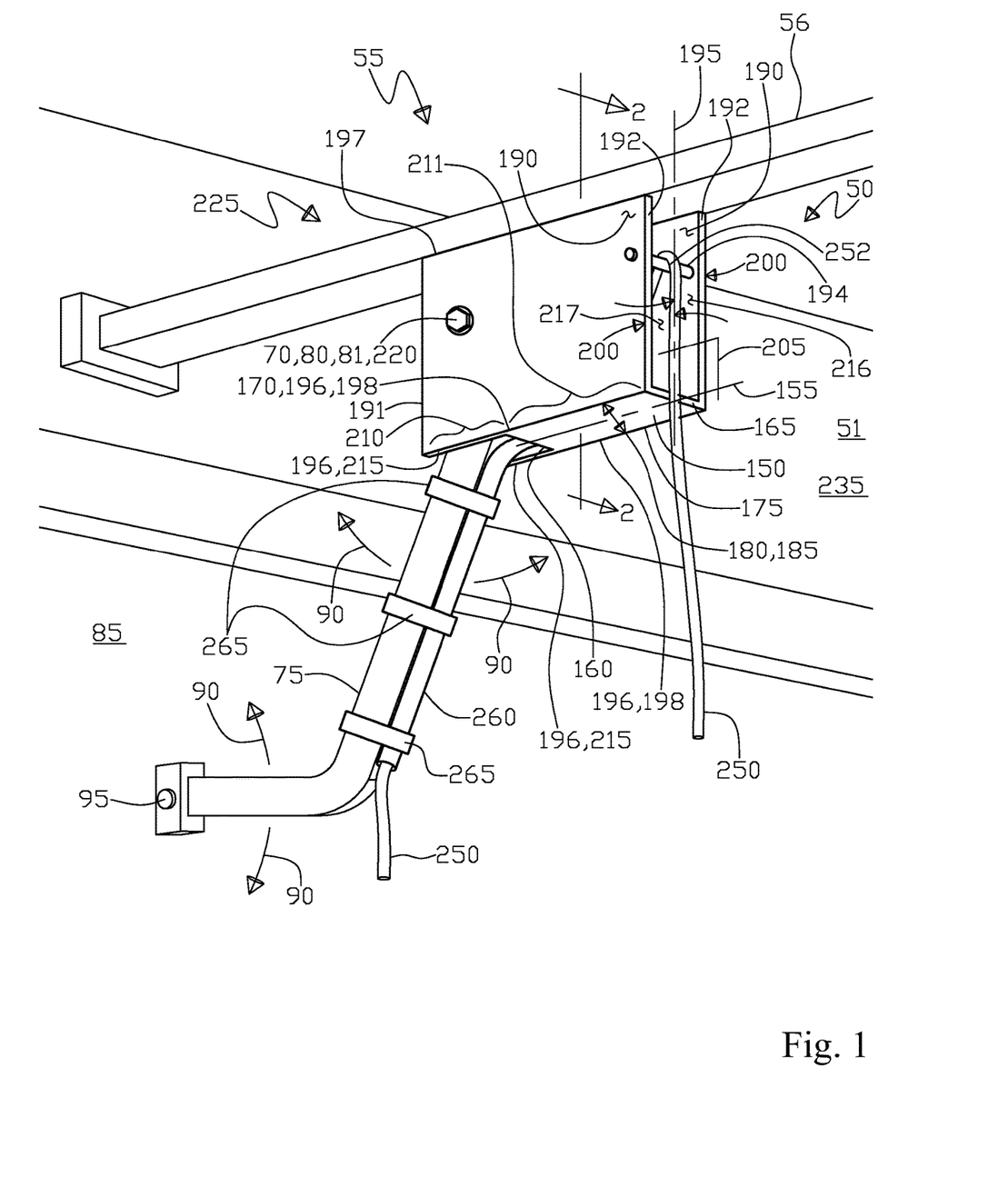

With initial reference to FIG. 1, shown is a perspective view of the movable latch housing apparatus 50 installed on the automatic garage door opener mechanism including the garage door 85, the channel guide 56, and the extension arm 75 pivotally attached 95 to both the garage door 85 and a pivotal attachment 80 to a shoulder 65. Wherein, FIG. 1 also shows the housing 50 substantially encloses 225 the disengagement lever 100 through its pivotal movement 110 via the combination of the base 150 and the sidewalls 190 thus shrouding the disengagement lever 100 from external prying by the device 230 (not shown, see FIGS. 5 and 6) that can attempt to move the disengagement lever 100 from the engaged state 130 to the disengaged state 135 thus allowing the garage door 85 to be freely opened 140 by anyone. Note that further, FIG. 1 shows that the housing 50 travels with the slidable engagement 60 as against the channel 56 of the automatic garage door opener mechanism, further shown is the first margin 160 forming the open ended slot 215 that gives clearance for the pivotal movement 90 of the extension arm 75.

Figure 2:
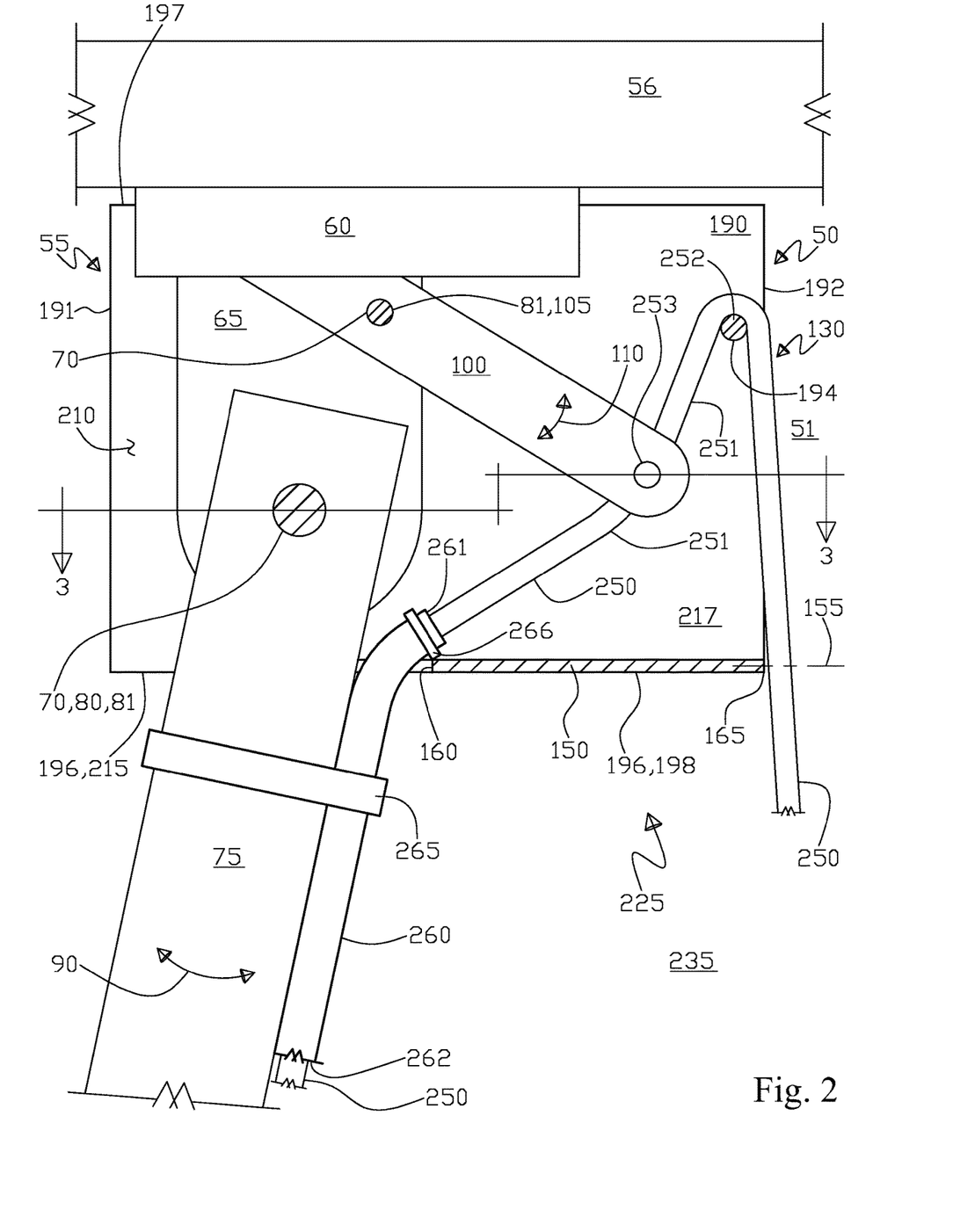
FIG. 2 shows cross section view 2-2 from FIG. 1 of the movable latch housing apparatus installed on the automatic garage door opener mechanism including the garage door, the channel guide, the slidable engagement, the extension arm pivotally attached to both the garage door and a pivotal attachment to a shoulder, the disengagement lever, the pivotal attachment of the disengagement lever, wherein it is shown the positioning of the housing substantially enclosing the disengagement lever through its pivotal movement, further shown is the first margin forming the open ended slot that gives clearance for the pivotal movement of the extension arm.

Continuing, FIG. 2 shows cross section view 2-2 from FIG. 1 of the movable latch housing apparatus 50 installed on the automatic garage door opener mechanism including the garage door 85, the channel guide 56, the slidable engagement 60, the extension arm 75 pivotally attached 95 to both the garage door 85 and the pivotal attachment 80 to the shoulder 65. Also, FIG. 2 shows the disengagement lever 100, the pivotal attachment 105 of the disengagement lever 100, wherein it is shown the positioning of the housing 50 substantially enclosing 225 the disengagement lever 100 through its pivotal movement 110, further shown is the first margin 160 forming the open ended slot 215 that gives clearance for the pivotal movement 90 of the extension arm 75.

Figure 3:
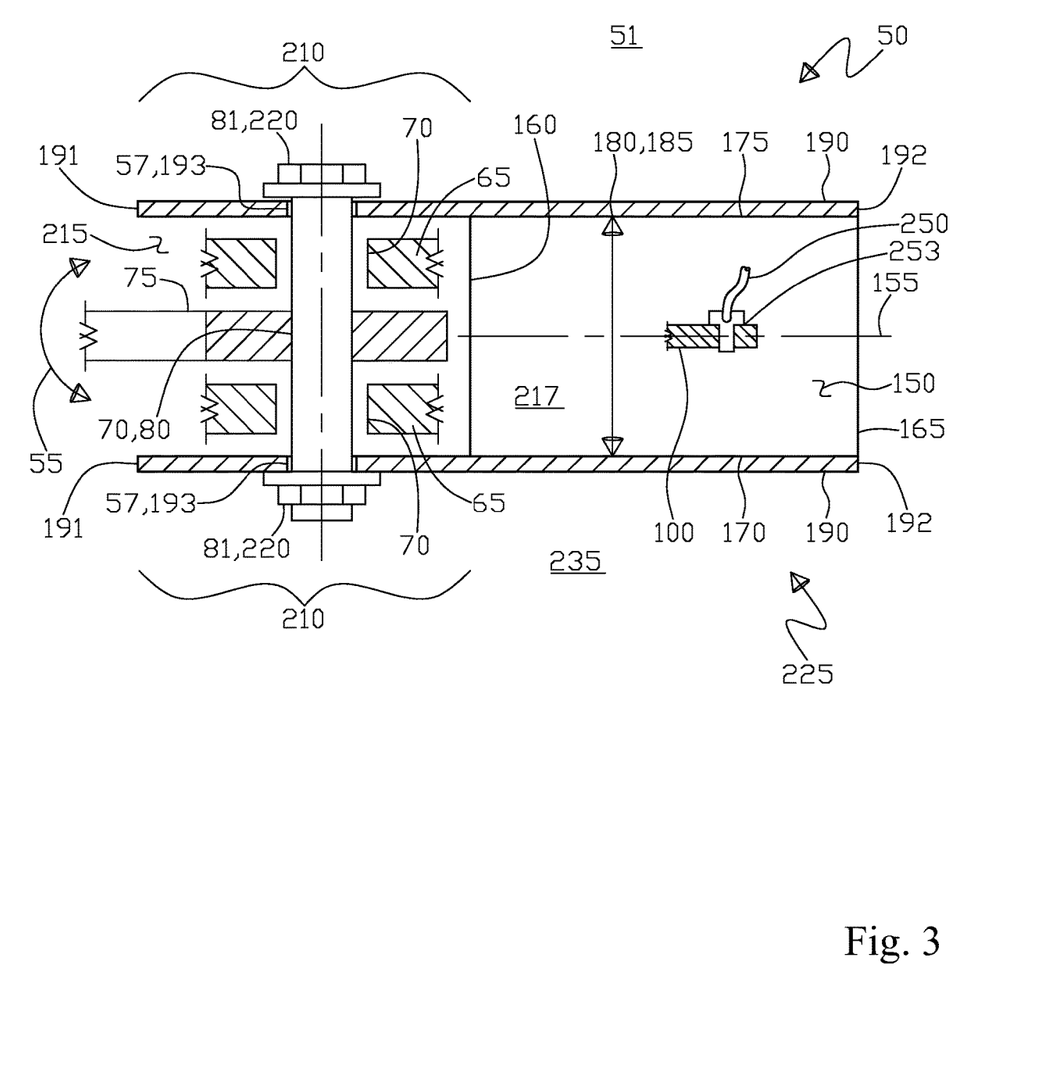
FIG. 3 shows cross sectional view 3-3 from FIG. 2 of the movable latch housing apparatus installed on the automatic garage door opener mechanism including the extension arm pivotally attached to the shoulder, a portion of the disengagement lever, wherein it is shown the positioning of the housing substantially enclosing the disengagement lever through its pivotal movement, further shown is the first margin forming the open ended slot that gives clearance for the pivotal movement of the extension arm.

Yet, further FIG. 3 shows cross sectional view 3-3 from FIG. 2 of the movable latch housing apparatus 50 installed on the automatic garage door opener mechanism including the extension arm 75 pivotally attached 80 to the shoulder 65, and a portion of the disengagement lever 100. Wherein, FIG. 3 shows the positioning of the housing 50 substantially enclosing 225 the disengagement lever 100 through its pivotal movement 110, further shown is the first margin 160 forming the open ended slot 215 that gives clearance for the pivotal movement 90 of the extension arm 75.

Figure 4:
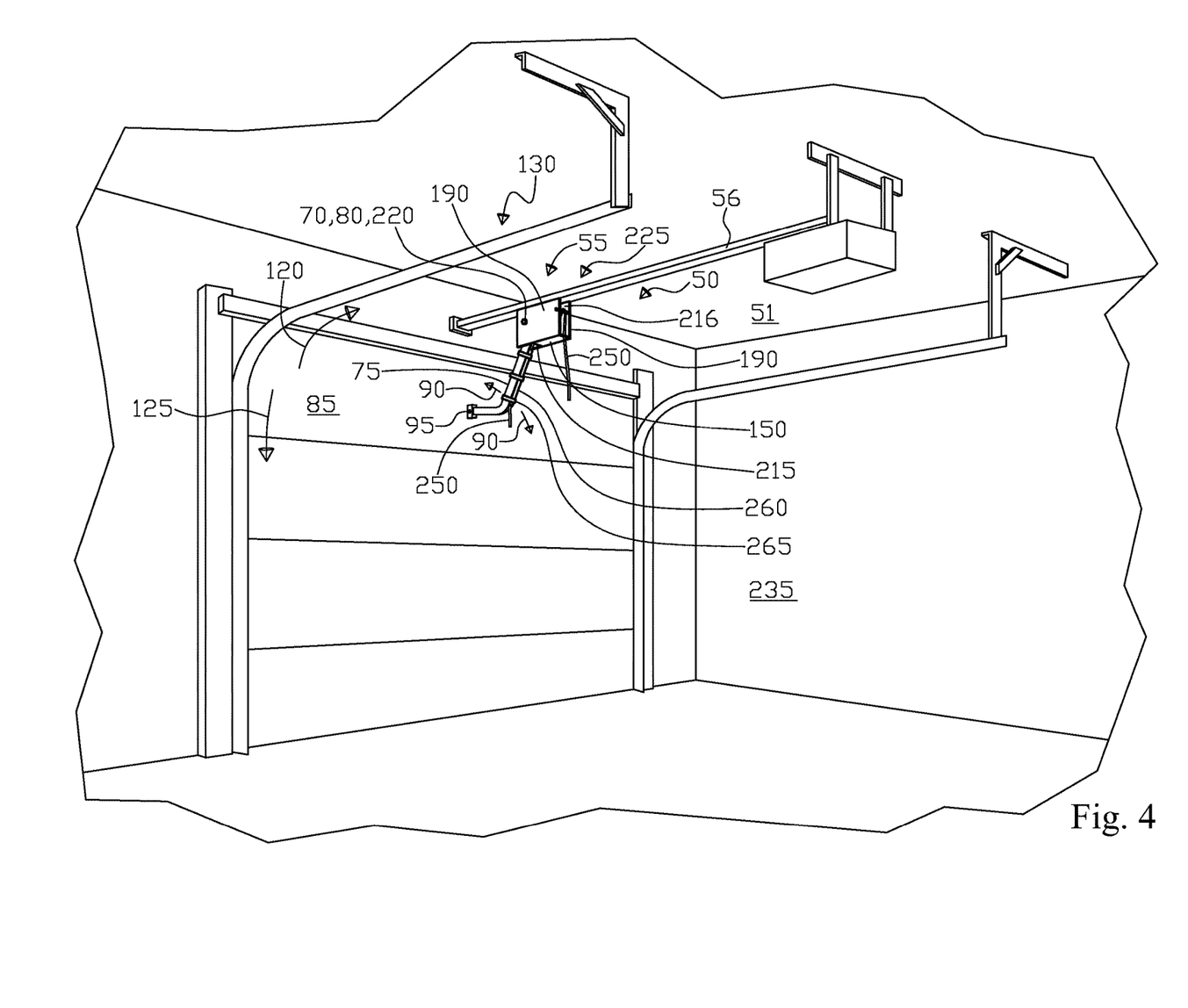

Next, FIG. 4 shows a portion of the entire garage perspective view of the movable latch housing apparatus 50 installed on the automatic garage door opener mechanism including the garage door 85, the channel guide 56, and the extension arm 75 pivotally attached 95 to both the garage door 85 and the pivotal attachment 80 to the shoulder 65. Wherein, FIG. 4 further shows the housing 50 substantially enclosing 225 the disengagement lever 100 through its pivotal movement 110 via the combination of the base 150 and the sidewalls 190 thus shrouding the disengagement lever 100 from external prying by the device 230 (not shown) that can attempt to move 110 the disengagement lever 100 from the engaged state 130 to the disengaged state 135 thus allowing the garage door 85 to be freely opened by anyone. Note that in FIG. 4 the housing 50 travels with the slidable engagement 60 as against the channel 56 of the automatic garage door opener mechanism, further shown is the open ended slot 215 that gives clearance for the pivotal movement 90 of the extension arm 75.

Figure 5:
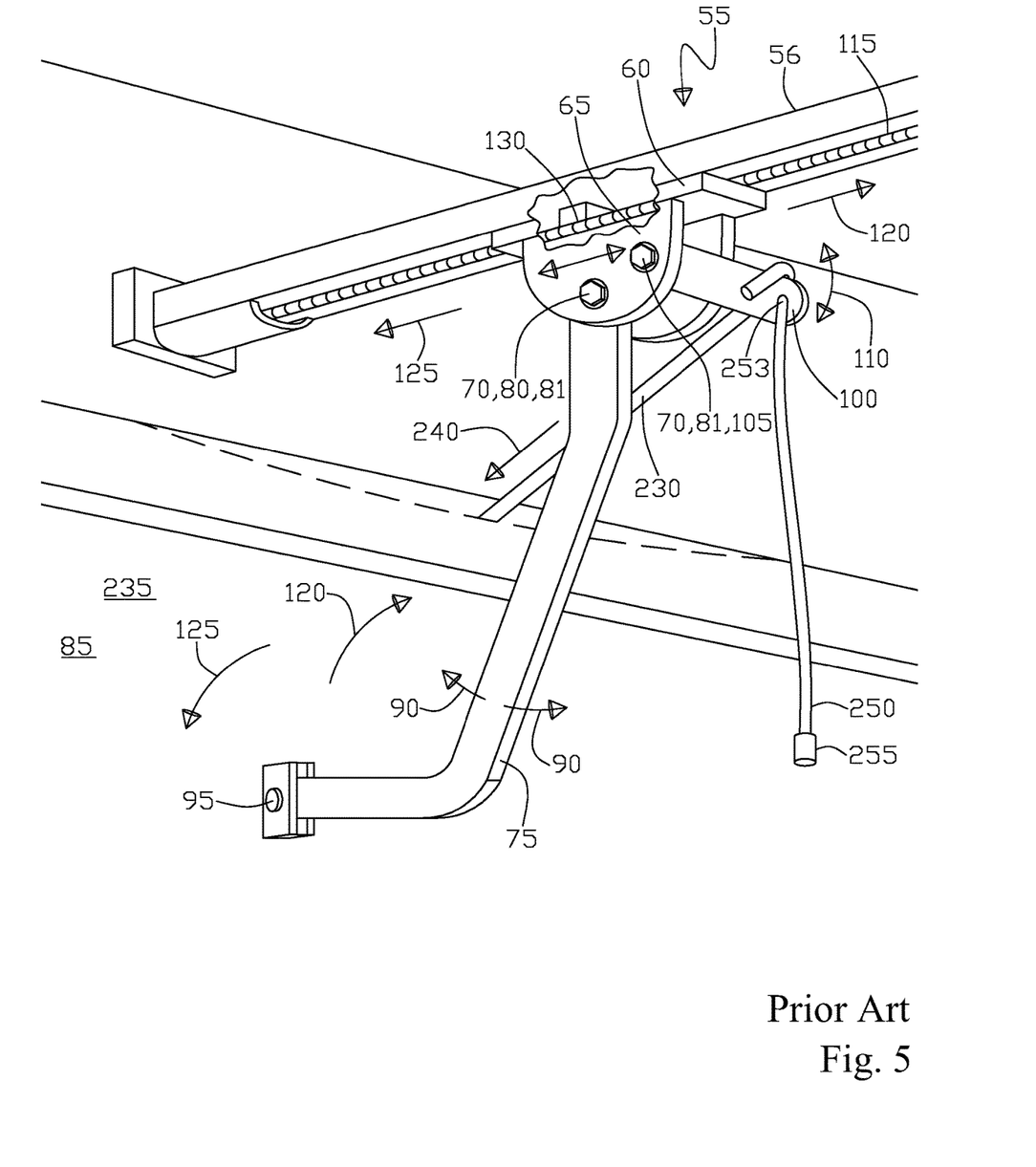

Continuing, FIG. 5 shows a perspective view of the prior art automatic garage door opener mechanism without the present invention of the movable latch housing apparatus 50, which includes the garage door 85, the channel guide 56, the slidable engagement structure 60 to the channel 56, the pivotal attachment shoulder 65, the extension arm 75 pivotally attached 95 to both the garage door 85 and the pivotal attachment 80 to the shoulder 65. Further shown in FIG. 5 is the disengagement lever 100, the pivotal attachment 105 of the disengagement lever 100 to the shoulder 65, the pivotal movement 110 of the disengagement lever 100, the linear drive 115 that moves 120, 125 the slidable engagement structure 60 along the channel 56 to drive the garage door 85 open 120 and closed 125 when the disengagement lever 100 is in the engaged state 130.

Also, in FIG. 5, when the disengagement lever 100 is in an engaged state 130 to the linear drive 115, this would be considered the normal default state of the automatic garage door opener, wherein the automatic garage door opener fully controls the opening 120 and closing 125 of the garage door 85, however, for illustration of the problem of placing the disengagement lever 100 into the disengaged state 135 from an unauthorized external device 230, the device 230 is shown in a typical position via prying through the upper portion of the garage door 85 to reach the disengagement lever 100 from outside of the garage door 85 and with the device 230 typically being of rigid construction wherein it can "hook" the disengagement lever 100 as shown.

Figure 6:
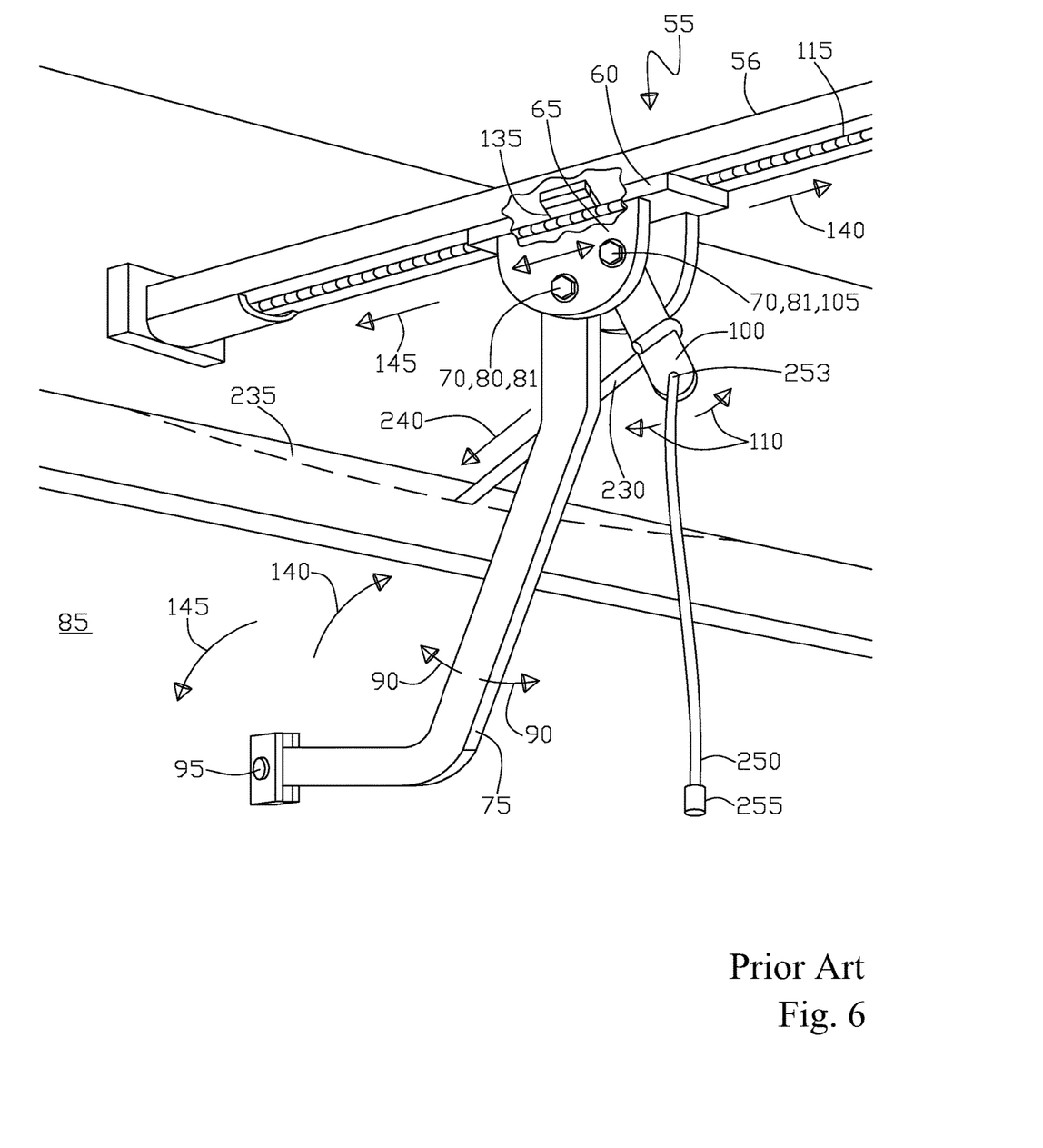

Next, FIG. 6 shows a perspective view of the prior art automatic garage door opener mechanism including the garage door 85, the channel guide 56, the slidable engagement structure 60 to the channel guide 56, the pivotal attachment shoulder 65, the extension arm 75 pivotally attached 95 to both the garage door 85 and the pivotal attachment 80 to the shoulder 65. Further, FIG. 6 shows the disengagement lever 100, the pivotal attachment 105 of the disengagement lever 100 to the shoulder 65, the pivotal movement 110 of the disengagement lever 100, the linear drive 115, and the disengagement lever 100 pulled 240 by the device 230 placing the disengagement lever 100 into the disengaged state 135 to the linear drive 115.

Thus as FIG. 6 being a continuation from FIG. 5, FIG. 6 shows the device 230 being shown in a typical pulled 240 position wherein the device 230 can attempt to move the disengagement lever 100 from the engaged state 130 (FIG. 5) to the disengaged state 135 (FIG. 6) thus allowing the garage door 85 to be freely manually opened 140 by anyone as shown as the disengagement lever 100 being disengaged 135 from the linear drive 155 allows the slidable channel engagement structure 60 to freely slide on the channel guide 56 thus allowing the garage door 85 to easily be opened 140 from outside of the garage.

Figure 7:
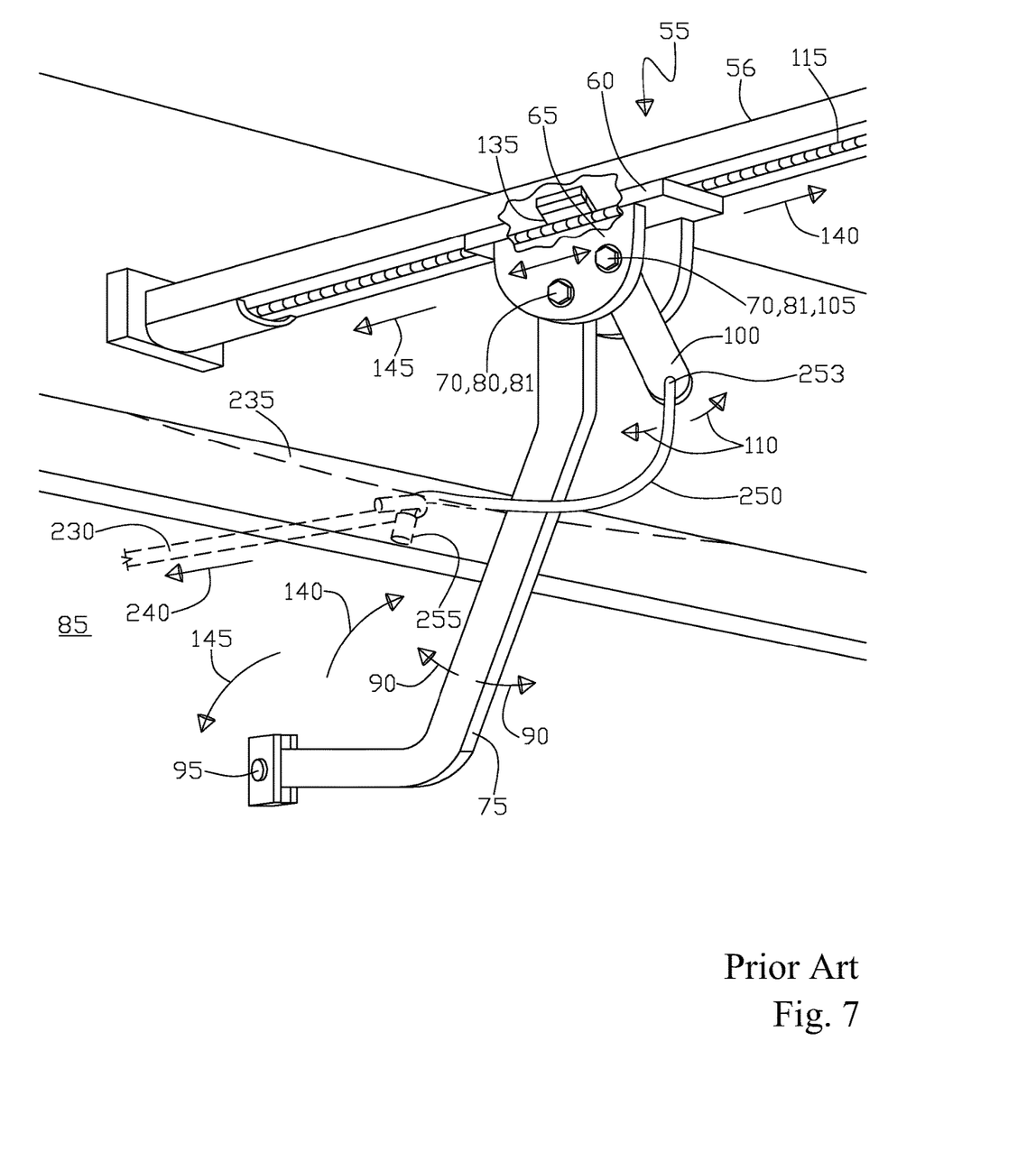

Further, in FIG. 7 shown is a perspective view of the prior art automatic garage door opener mechanism including the garage door 85, the channel guide 56, the slidable engagement structure 60 to the channel guide 56, the pivotal attachment shoulder 65, the extension arm 75 pivotally attached 95 to both the garage door 85 and the pivotal attachment 80 to the shoulder 65. In addition FIG. 7 shows the disengagement lever 100, the pivotal attachment 105 of the disengagement lever 100 the shoulder 65, the pivotal movement 110 of the disengagement lever 100, the linear drive 115, and the disengagement lever 100 being in a disengaged state 135 to the linear drive 115. Thus FIG. 7 as being similar to FIG. 5, however, FIG. 7 shows the device 230 in a typical pulled position 240 wherein the device 230 can attempt to hook onto the bulb 255 that is connected to the release pull cord 250 to enable movement of the disengagement lever 100 from the engaged state 130 to the disengaged state 135 thus allowing the garage door 85 to be freely manually opened 140 from outside the garage.

Broadly, in referring to FIGS. 1 to 4, the present invention is of a movable latch housing apparatus 50 for enhancing security of a latch mechanism 55 is disclosed, wherein the latch mechanism 55 itself as prior art is shown alone in detail in FIGS. 5 and 6. Thus, referring to FIGS. 5 and 6 for the clearest view, the latch mechanism 55 itself has the slidable channel engagement structure 60, the pivotal attachment shoulder 65, the extension arm 75 pivotally attached 80 via pivot beam 81 to the shoulder 65 and oppositely pivotally attached 95 to the door 85. Also the latch mechanism 55 includes the disengagement lever 100 pivotally attached 105 via pivot beam 81 to the shoulder 65 and removably engaged to the linear drive 115 in the channel guide 56, with the lever 100 having an engaged state 130 wherein the linear drive 115 opens 120 and closes 125 the door 85 and the lever 100 having a disengaged state 135 allowing the door 85 to be manually opened 140 and closed 145 freely without the linear drive 115.

Returning to FIGS. 1 to 4, the movable latch housing apparatus 50 includes the base 150 having the longitudinal axis 155 with the first margin 160 and an opposing second margin 165 with the longitudinal axis 155 spanning therebetween, further the base 150 also having a first border 170 and an opposing second border 175 that are positioned about the longitudinal axis 155 in a straddle manner 180 and juxtapose 185 to the longitudinal axis 155, see FIGS. 1 to 3 in particular.

Also included in the movable latch housing apparatus 50 is the pair of opposing sidewalls 190 that can be further defined by a first end 191 and an opposing second end 192 and in a perpendicular manner by a first boundary 196 and a second boundary 197, said sidewalls 190 extending from an affixed junction 198 of said first boundary 196 and said first border 170 and said second border 175 respectively in a same direction forming a base section 211 of said sidewalls 190, with the sidewalls 190 extending parallel 200 to a longwise axis 195 that is oriented in a perpendicular manner 205 to the longitudinal axis 155, as best shown in FIGS. 1 to 3. The sidewalls 190 each have an elongation section 210 beyond the first margin 160 forming the open ended slot 215 that is defined by the first margin 160 and the first boundaries 196 that the extension arm 75 has pivotal movement 90 within, see FIGS. 1 to 4. The pair of sidewalls 190 and base 150 define a housing interior 217, as shown in FIGS. 1 and 2. The sidewall 190 elongation sections 210 each have a means for affixment 220 to the pivotal attachment 70 of the shoulder 65, see FIGS. 1 to 4. Wherein operationally, the combination of the base 150 and the pair of sidewalls 190 substantially enclose 225 the disengagement lever 100 through its pivotal movement 110 as between the engaged state 130 and the disengaged state 135 to help prevent a device 230 external 235 to the housing 50 from placing the lever 100 from the engaged state 130 to the disengaged state 135, as shown in going from FIG. 5 to FIG. 6.

As an option for the movable latch housing apparatus 50, the means 220 for the sidewall 190 elongation sections 210 affixment to the pivotal attachment 70 of the shoulder 65 is preferably constructed of an aperture 193 disposed in each of the sidewall 190 elongation sections 210, wherein the pivotal attachment 70 is secured therethrough each aperture 193 via pivot beam 81 to affix each sidewall 190 to opposite sides 57 of the latch mechanism 55, as best shown in FIG. 3 in particular and also FIGS. 1, 2, and 4.

Another option for the movable latch housing apparatus 50 is where each aperture 193 is round in shape to be sized and configured to tightly fit about the pivotal attachment 70 in the form of the pivot beam 81, see FIGS. 2 and 3.

A continuing option for the movable latch housing apparatus 50 is where the opposing sidewalls 190 can each have a first end 191 and an opposing second end 192 along the longitudinal axis 155 such that the pair of second ends 192 and the base 150 second margin 165 define an open passageway 216 that is operational to accommodate the disengagement lever 100 that has a pull cord 250 that has bi-directional extensions 251 for access to the pull cord 250 from both the open slot 215 and the open passageway 216 both being external 51 to the movable latch housing apparatus 50, see particularly FIG. 2 and then FIGS. 1 and 3.

A further option for the movable latch housing apparatus 50 can further comprise an arm 194 affixed therebetween the opposing sidewalls 190, wherein the arm 194 is positioned in the base sections 211 of the opposing sidewalls 190 to be adjacent to the open passageway 216, wherein operationally the arm 194 provides a sheave 252 for the bi-directional 251 pull cord 250 extensions, again see particularly FIG. 2 and then FIG. 1.

Yet further another option for the movable latch housing apparatus 50 can further comprise a flexible sleeve 260 that is sized and configured to have a slidable engagement to the pull cord 250 that is attached 253 to the disengagement lever 100, wherein structurally the sleeve 260 fully circumferentially encloses the pull cord 250, the sleeve 260 having the primary end portion 261 and the opposing secondary end portion 262 wherein the pull cord 250 emerges from each of the primary 261 and secondary 262 ends, see FIGS. 1 and 2. The sleeve 260 primary end portion 261 is preferably affixed 266 to the base 150 such that the sleeve 260 primary end portion 261 is disposed within the housing 50 interior 217, further the sleeve 260 is also affixed 265 to the extension arm 75, again see FIGS. 1 and 2. Wherein operationally the sleeve 260 protects the pull cord 250 from the device 230 thus helping to shield the lever 100 from being manually moved from the engaged state 130 to the disengaged state 135, thus enabling the device 230 to allow the latch mechanism 55 to be manually moved to open the door 85 via the device 230 only, see FIGS. 5, 6, and 7.

Method of Installation

Looking at FIGS. 1 to 4 in particular for installing the movable latch housing apparatus 50 to the latch mechanism 55, starting with a first step of providing the movable latch housing apparatus 50 as previously described and a second step of providing the latch mechanism 55 as previously described. Next, a third step of attaching each sidewall 190 to the pivotal attachment 70, 81 utilizing each aperture 193 on opposing sides 57 of the pivotal attachment 70 such that the pivot beam 81 extends therethrough each aperture 193, plus further ensuring that the extension arm 75 and the disengagement lever 100 have free pivotal movements 90, 110, with each sidewall 190 attached to the pivotal attachment 70, 81, see in particular FIG. 2, plus FIGS. 1, 3, and 4.

Next, a forth step of moving the disengagement lever 100 to be in the engaged state 130, wherein operationally a combination of the base 150 and the pair of sidewalls 190 substantially enclose the disengagement lever 100 through its pivotal movement 110 as between the engaged state 130 and the disengaged state 135 to help prevent the device 230 in the form of a hooked rod that is external 51 to the housing 50 from placing the lever 100 from the engaged state 130 to the disengaged state 135, thus enabling the hooked rod device 230 to allow the latch mechanism 55 to be manually moved to open the garage door 85 via the hooked rod device 230 only, see FIGS. 5, 6, and 7.

As optional steps for installing the movable latch housing apparatus 50 to the latch mechanism 55, the movable latch housing apparatus 50 can further include the flexible sleeve 260 as previously described, wherein an added step of feeding the pull cord 250 therethrough the sleeve 260 such that the pull cord 250 emerges from each of the primary 261 and secondary 262 ends. Further an added optional step is of affixing 266 the sleeve 260 primary end portion 261 to the base 150 such that the sleeve primary end portion 261 is disposed within the housing 50 interior 217, further an optional step of affixing 265 the sleeve 260 to the extension arm 75, see FIGS. 1 and 2. Wherein operationally the sleeve 260 protects the pull cord 250 from the hooked rod device 230, thus helping to shield the disengagement lever 100 from being manually moved from the engaged state 130 to the disengaged state 135, thus enabling the device 230 to allow the latch mechanism 55 to be manually moved to open the garage door 85 via the device 230 only, see FIGS. 5, 6, and 7.

As further optional steps for installing the movable latch housing apparatus 50 to the latch mechanism 55, the movable latch housing apparatus 50 can further include the open passageway 216 as previously defined and the movable latch housing apparatus 50 can also further include the arm 194 as previously described. Wherein an added optional step of threading the pull cord 250 that is attached 253 to the disengagement lever 100 over the arm 194 and routing the pull cord 250 to exit therethrough the open passageway 216 into the external environment 51, see FIGS. 1 and 2. Wherein operationally, the arm 194 provides the sheave 252 for the bi-directional 251 pull cord 250 extension that is operational to accommodate the disengagement lever 100 that has the pull cord 250 that has the bi-directional extensions 251 for access to the pull cord 250 from both the open slot 215 and the open passageway 216 being external 51 to the movable latch housing apparatus 50, as pull cord 250 access is restricted with the housing 50 in place on the latch mechanism 55, whereas the open slot 215 and open passageway 216 seek to remedy this housing 50 restriction, see FIGS. 1 to 4.

CONCLUSION

Accordingly, the present invention of a latch housing apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A movable latch housing apparatus for enhancing security of an existing latch mechanism, wherein said movable latch housing apparatus is adapted to attach to said latch mechanism, said latch mechanism having a slidable channel engagement structure, a channel guide, a pivotal attachment shoulder, an extension arm having a pivotal attachment to the shoulder and the extension arm oppositely pivotally attached to a door, a disengagement lever having a pivotal attachment to the shoulder and the lever removably engaged to a linear drive in the channel guide with the lever having an engaged state wherein the linear drive opens and closes the door and the lever having a disengaged state allowing the door to be manually opened and closed freely without the linear drive, said movable latch housing apparatus comprising:

(a) a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis;

(b) a pair of opposing sidewalls each extending in a same direction from said first border and said second border respectively forming a base section of said sidewalls, said sidewalls extending parallel to a longwise axis that is oriented in a perpendicular manner to said longitudinal axis, said sidewalls each have an elongation section beyond said first margin forming an open ended slot as defined by said first margin and said sidewalls elongation sections that the extension arm has pivotal movement within, said pair of sidewalls and said base defining a housing interior, said sidewall elongation sections each have a means for affixment to the pivotal attachment of the shoulder, wherein operationally a combination of said base and said pair of sidewalls substantially enclose the disengagement lever through its pivotal movement from the engaged state to the disengaged state to help prevent a device external to said housing from placing the lever from the engaged state to the disengaged state, which would undesirably enable the device to allow the latch mechanism to be manually moved to open the door via the device only, thereby bypassing the security of the latch mechanism, wherein said opposing sidewalls each have a sidewall first end and an opposing sidewall second end along said longitudinal axis such that said pair of sidewall second ends and said base second margin define an open passageway that is operational to accommodate the disengagement lever that has a pull cord attached that has bi-directional extensions for access to the pull cord from both said open ended slot and said open passageway external to said movable latch housing apparatus; and (c) an arm affixed therebetween said opposing sidewalls, wherein said arm is positioned in said base sections of said opposing sidewalls to be adjacent to said open passageway, wherein operationally said arm provides a sheave for the bi-directional pull cord extensions.

2. The movable latch housing apparatus according to claim 1 wherein said means for said sidewall elongation sections affixment to the pivotal attachment of the shoulder is constructed of an aperture disposed in each of said sidewall elongation sections, wherein the pivotal attachment is secured therethrough each said aperture to affix each said sidewall to opposite sides of the latch mechanism.

3. The movable latch housing apparatus according to claim 2 wherein each said aperture is round in shape to be sized and configured to tightly fit about the pivotal attachment.

4. A movable latch housing apparatus for enhancing security of an existing latch mechanism, wherein said movable latch housing apparatus is adapted to attach to said latch mechanism, said latch mechanism is in the form of a garage door opener with the latch mechanism having a slidable channel engagement structure, a channel guide, a pivotal attachment shoulder, an extension arm having a pivotal attachment to the shoulder and the extension arm oppositely pivotally attached to a garage door, a disengagement lever that has a pivotal attachment to the shoulder and the lever is removably engaged to a linear drive in the channel guide with the lever having an engaged state wherein the linear drive opens and closes the garage door and the lever having a disengaged state allowing the garage door to be manually opened and closed freely without the linear drive, said movable latch housing apparatus comprising:
  (a) a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis;
  (b) a pair of opposing sidewalls each defined by a first end and an opposing second end and in a perpendicular manner defined by a first boundary and an opposing second boundary, said sidewalls extending from an affixed junction of said first boundary from said first border and said second border respectively in a same direction forming a base section of said sidewalls, said sidewalls extending parallel to a longwise axis that is oriented in a perpendicular manner to said longitudinal axis, said sidewalls each have an elongation section beyond said first margin forming an open ended slot that is defined by said first margin and said first boundaries that the extension arm has pivotal movement within, said pair of sidewalls and said base defining a housing interior, said sidewall elongation sections each have an aperture disposed therethrough, wherein the pivotal attachment is secured therethrough each said aperture to affix each said sidewall to opposite sides of the latch mechanism, wherein operationally a combination of said base and said pair of sidewalls substantially enclose the disengagement lever through its pivotal movement from the engaged state to the disengaged state to help prevent a device in the form of a hooked rod that is external to said housing from placing the lever from the engaged state to the disengaged state, which would undesirably enable the hooked rod device to allow the latch mechanism to be manually moved to open the garage door via the hooked rod device only, thereby bypassing the security of the latch mechanism, wherein said opposing sidewalls each have said sidewall first end and said opposing sidewall second end that are along said longitudinal axis are configured such that said pair of sidewall second ends and said base second margin define an open passageway that is operational to accommodate the disengagement lever that has a pull cord attached that has bi-directional extensions for access to the pull cord from both said open ended slot and said open passageway external to said movable latch housing apparatus; and
  (c) an arm affixed therebetween said opposing sidewalls, wherein said arm is positioned in said base sections of said opposing sidewalls to be adjacent to said open passageway, wherein operationally said arm provides a sheave for the bi-directional pull cord extensions.

5. The movable latch housing apparatus according to claim 4 wherein each said aperture is round in shape to be sized and configured to tightly fit about the pivotal attachment in the form of a pivot beam.

6. A method of installing a movable latch housing apparatus onto a latch mechanism that is in the form of a garage door opener with the latch mechanism having a slidable channel engagement structure, a channel guide, a pivotal attachment shoulder, an extension arm having a pivotal attachment to the shoulder and the extension arm oppositely pivotally attached to a garage door, a disengagement lever that has a pivotal attachment to the shoulder and the lever is removably engaged to a linear drive in the channel with the lever having an engaged state wherein the linear drive opens and closes the garage door and the lever having a disengaged state allowing the garage door to be manually opened and closed freely without the linear drive, said method of installing said movable latch housing apparatus comprising the steps of:
  (a) providing a movable latch housing apparatus that includes a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis, also included in the movable latch housing apparatus is a pair of opposing sidewalls each defined by a first end and an opposing second end and in a perpendicular manner defined by a first boundary and an opposing second boundary, said sidewalls extending from an affixed junction of said first boundary from said first border and said second border respectively in a same direction forming a base section of said sidewalls, said sidewalls extending parallel to a longwise axis that is oriented in a perpendicular manner to said longitudinal axis, said sidewalls each have an elongation section beyond said first margin forming an open ended slot that is defined by said first margin and said first boundaries that the extension arm has pivotal movement within, said pair of sidewalls and said base defining a housing interior, said sidewall elongation sections each have an aperture disposed therethrough, wherein the pivotal attachment is secured therethrough each said aperture to affix each said sidewall to opposite sides of the latch mechanism, wherein said movable latch housing apparatus further includes a flexible sleeve that is sized and configured to have a slidable engagement to a pull cord that is attached to the disengagement lever, wherein structurally said sleeve fully circumferentially encloses the pull cord, said sleeve having a primary end portion and an opposing secondary end portion;
  (b) providing a latch mechanism that is in the form of a garage door opener with the latch mechanism having a slidable channel engagement structure, a channel guide, a pivotal attachment shoulder, an extension arm having a pivotal attachment on a pivot beam to the shoulder and the extension arm oppositely pivotally attached to a garage door, a disengagement lever that has a pivotal attachment on a pivot beam to the shoulder and the lever is removably engaged to a linear drive in the channel with the lever having an engaged state wherein the linear drive opens and closes the garage door and the lever having a disengaged state allowing the garage door to be manually opened and closed freely without the linear drive;

(c) attaching each said sidewall to the pivotal attachment utilizing each said aperture on opposing sides of the pivotal attachment such that the pivot beam extends therethrough each said aperture, ensuring that the extension arm and the disengagement lever both have free pivotal movement with each said sidewall attached to the pivotal attachment;

(d) moving the disengagement lever to be in the engaged state, wherein operationally a combination of said base and said pair of sidewalls substantially enclose the disengagement lever through its pivotal movement from the engaged state to the disengaged state to help prevent a device in the form of a hooked rod that is external to said housing from placing the lever from the engaged state to the disengaged state, which would undesirably enable the hooked rod device to allow the latch mechanism to be manually moved to open the garage door via the hooked rod device only thereby bypassing the security of the latch mechanism; and (e) feeding the pull cord therethrough said sleeve such that the pull cord emerges from each of said primary and secondary ends, further to the added step is affixing said sleeve primary end portion to said base such that said sleeve primary end portion is disposed within said housing interior, further affixing said sleeve to the extension arm, wherein operationally said sleeve protects the pull cord from the hooked rod device thus helping to shield the disengagement lever from being manually moved from the engaged state to the disengaged state, thus preventing the device from allowing the latch mechanism to be manually moved to open the garage door via the device only.

7. A movable latch housing apparatus for enhancing security of an existing latch mechanism, wherein said movable latch housing apparatus is adapted to attach to said latch mechanism, said latch mechanism having a slidable channel engagement structure, a channel guide, a pivotal attachment shoulder, an extension arm having a pivotal attachment to the shoulder and the extension arm oppositely pivotally attached to a door, a disengagement lever having a pivotal attachment to the shoulder and the lever removably engaged to a linear drive in the channel guide with the lever having an engaged state wherein the linear drive opens and closes the door and the lever having a disengaged state allowing the door to be manually opened and closed freely without the linear drive, said movable latch housing apparatus comprising:

(a) a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis;

(b) a pair of opposing sidewalls each extending in a same direction from said first border and said second border respectively forming a base section of said sidewalls, said sidewalls extending parallel to a longwise axis that is oriented in a perpendicular manner to said longitudinal axis, said sidewalls each have an elongation section beyond said first margin forming an open ended slot as defined by said first margin and said sidewalls elongation sections that the extension arm has pivotal movement within, said pair of sidewalls and said base defining a housing interior, said sidewall elongation sections each have a means for affixment to the pivotal attachment of the shoulder, wherein operationally a combination of said base and said pair of sidewalls substantially enclose the disengagement lever through its pivotal movement from the engaged state to the disengaged state to help prevent a device external to said housing from placing the lever from the engaged state to the disengaged state, which would undesirably enable the device to allow the latch mechanism to be manually moved to open the door via the device only, thereby bypassing the security of the latch mechanism; and (c) a flexible sleeve that is sized and configured to have a slidable engagement to a pull cord that is attached to the disengagement lever, wherein structurally said sleeve fully circumferentially encloses the pull cord, said sleeve having a primary end portion and an opposing secondary end portion wherein the pull cord emerges from each of said primary and secondary ends, said sleeve primary end portion is affixed to said base such that said sleeve primary end portion is disposed within said housing interior, further said sleeve is also affixed to the extension arm, wherein operationally said sleeve protects the pull cord from the device thus helping to shield the lever from being manually moved from the engaged state to the disengaged state, thus preventing the device from allowing the latch mechanism to be manually moved to open the door via the device only.

8. A movable latch housing apparatus for enhancing security of an existing latch mechanism, wherein said movable latch housing apparatus is adapted to attach to said latch mechanism, said latch mechanism is in the form of a garage door opener with the latch mechanism having a slidable channel engagement structure, a channel guide, a pivotal attachment shoulder, an extension arm having a pivotal attachment to the shoulder and the extension arm oppositely pivotally attached to a garage door, a disengagement lever that has a pivotal attachment to the shoulder and the lever is removably engaged to a linear drive in the channel guide with the lever having an engaged state wherein the linear drive opens and closes the garage door and the lever having a disengaged state allowing the garage door to be manually opened and closed freely without the linear drive, said movable latch housing apparatus comprising:

(a) a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis;

(b) a pair of opposing sidewalls each defined by a first end and an opposing second end and in a perpendicular manner defined by a first boundary and an opposing second boundary, said sidewalls extending from an affixed junction of said first boundary from said first border and said second border respectively in a same direction forming a base section of said sidewalls, said sidewalls extending parallel to a longwise axis that is oriented in a perpendicular manner to said longitudinal axis, said sidewalls each have an elongation section beyond said first margin forming an open ended slot that is defined by said first margin and said first boundaries that the extension arm has pivotal movement within, said pair of sidewalls and said base defining a housing interior, said sidewall elongation sections each have an aperture disposed therethrough, wherein the pivotal attachment is secured therethrough each said aperture to affix each said sidewall to opposite sides of the latch mechanism, wherein operationally a combination of said base and said pair of sidewalls substantially enclose the disengagement lever through its pivotal movement from the engaged state to the disengaged state to help prevent a device in the form of a hooked rod that is external to said housing from placing the lever from the engaged state to the disengaged state, which would undesirably enable the hooked rod device to allow the latch mechanism to be manually moved to open the garage door via the hooked rod device only, thereby bypassing the security of the latch mechanism; and (c) a flexible sleeve that is sized and configured to have a slidable engagement to a pull cord that is attached to the disengagement lever, wherein structurally said sleeve fully circumferentially encloses the pull cord, said sleeve having a primary end portion and an opposing secondary end portion wherein the pull cord emerges from each of said primary and secondary ends, said sleeve primary end portion is affixed to said base such that said sleeve primary end portion is disposed within said housing interior, further said sleeve is also affixed to the extension arm, wherein operationally said sleeve protects the pull cord from the hooked rod device thus helping to shield the lever from being manually moved from the engaged state to the disengaged state, thus preventing the device from allowing the latch mechanism to be manually moved to open the garage door via the device only.

9. A method of installing a movable latch housing apparatus onto a latch mechanism that is in the form of a garage door opener with the latch mechanism having a slidable channel engagement structure, a channel guide, a pivotal attachment shoulder, an extension arm having a pivotal attachment to the shoulder and the extension arm oppositely pivotally attached to a garage door, a disengagement lever that has a pivotal attachment to the shoulder and the lever is removably engaged to a linear drive in the channel with the lever having an engaged state wherein the linear drive opens and closes the garage door and the lever having a disengaged state allowing the garage door to be manually opened and closed freely without the linear drive, said method of installing said movable latch housing apparatus comprising the steps of:

(a) providing a movable latch housing apparatus that includes a base having a longitudinal axis with a first margin and an opposing second margin with said longitudinal axis spanning therebetween, said base also having a first border and an opposing second border that are positioned about said longitudinal axis in a straddle manner and juxtapose to said longitudinal axis, also included in the movable latch housing apparatus is a pair of opposing sidewalls each defined by a first end and an opposing second end and in a perpendicular manner defined by a first boundary and an opposing second boundary, said sidewalls extending from an affixed junction of said first boundary from said first border and said second border respectively in a same direction forming a base section of said sidewalls, said sidewalls extending parallel to a longwise axis that is oriented in a perpendicular manner to said longitudinal axis, said sidewalls each have an elongation section beyond said first margin forming an open ended slot that is defined by said first margin and said first boundaries that the extension arm has pivotal movement within, said pair of sidewalls and said base defining a housing interior, said sidewall elongation sections each have an aperture disposed therethrough, wherein the pivotal attachment is secured therethrough each said aperture to affix each said sidewall to opposite sides of the latch mechanism, further included is an open passageway that is defined by said opposing sidewalls that each have said sidewall first end and said opposing sidewall second end along said longitudinal axis such that said pair of sidewall second ends and said base second margin define said open passageway, said movable latch housing apparatus also further including an arm affixed therebetween said opposing sidewalls, wherein said arm is positioned in said base sections of said opposing sidewalls to be adjacent to said open passageway;

(b) providing a latch mechanism that is in the form of a garage door opener with the latch mechanism having a slidable channel engagement structure, a channel guide, a pivotal attachment shoulder, an extension arm having a pivotal attachment on a pivot beam to the shoulder and the extension arm oppositely pivotally attached to a garage door, a disengagement lever that has a pivotal attachment on a pivot beam to the shoulder and the lever is removably engaged to a linear drive in the channel with the lever having an engaged state wherein the linear drive opens and closes the garage door and the lever having a disengaged state allowing the garage door to be manually opened and closed freely without the linear drive;

(c) attaching each said sidewall to the pivotal attachment utilizing each said aperture on opposing sides of the pivotal attachment such that the pivot beam extends therethrough each said aperture, ensuring that the extension arm and the disengagement lever both have free pivotal movement with each said sidewall attached to the pivotal attachment;

(d) moving the disengagement lever to be in the engaged state, wherein operationally a combination of said base and said pair of sidewalls substantially enclose the disengagement lever through its pivotal movement from the engaged state to the disengaged state to help prevent a device in the form of a hooked rod that is external to said housing from placing the lever from the engaged state to the disengaged state, which would undesirably enable the hooked rod device to allow the latch mechanism to be manually moved to open the garage door via the hooked rod device only thereby bypassing the security of the latch mechanism; and (e) threading a pull cord that is attached to the disengagement lever over said arm and routing the pull cord to exit therethrough said open passageway into an external environment, wherein operationally said arm provides a sheave for a bi-directional pull cord extension that is operational to accommodate the disengagement lever that has a pull cord attached that has the bi-directional extensions for access to the pull cord from both said open ended slot and said open passageway external to said movable latch housing apparatus.

* * * * *